United States Patent [19]

Masom

[11] Patent Number: 4,797,006
[45] Date of Patent: Jan. 10, 1989

[54] PYROMETER SYSTEMS FOR GAS-TURBINE ENGINES

[75] Inventor: Ronald A. Masom, Southampton, England

[73] Assignee: Smiths Industries Public Limited Company, London, England

[21] Appl. No.: 52,435

[22] Filed: May 20, 1987

[30] Foreign Application Priority Data

Jun. 5, 1986 [GB] United Kingdom ............... 8613622

[51] Int. Cl.⁴ .............................................. G01J 5/10
[52] U.S. Cl. ..................... 374/130; 356/43; 374/121; 374/133
[58] Field of Search ............... 374/129, 130, 121, 131, 374/133; 356/43-50

[56] References Cited

U.S. PATENT DOCUMENTS

| | | | |
|---|---|---|---|
| 3,207,027 | 9/1965 | Bouchet | 374/130 X |
| 3,623,368 | 11/1971 | Decker, Jr. | 374/131 X |
| 4,579,463 | 4/1986 | Rosenewaig et al. | 374/130 X |
| 4,582,426 | 4/1986 | Douglas | 374/130 X |

FOREIGN PATENT DOCUMENTS 699352 11/1979 U.S.S.R. ................. 374/130

*Primary Examiner*—John Petrakes
*Attorney, Agent, or Firm*—Pollock, Vande Sande & Priddy

[57] ABSTRACT

In a pyrometer system, a pyrometer provides output signals to a processor indicative of the temperature of rotating blades in a gas-turbine engine. The processor includes a synchronization unit and a gate controlled by the synchronization unit. After monitoring the output of the pyrometer to identify which parts of the output signal arise from radiation from the blades and which arise from the combustion chamber, the synchronization unit is set in synchronism with the blade signals and the gate is controlled to pass signals from the blade and to interrupt signals arising from the combustion chamber. The output of the processor is thereby indicative of blade temperature and is insensitive to combustion chamber radiation.

7 Claims, 2 Drawing Sheets

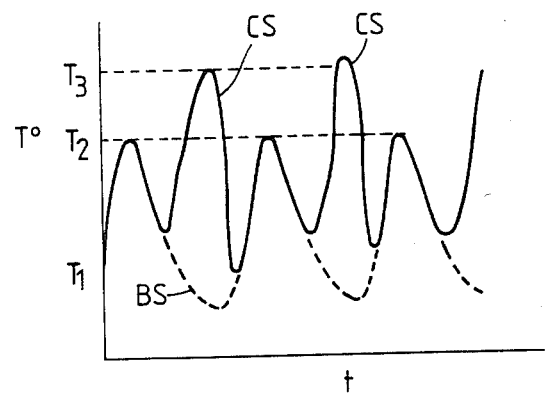
Fig. 2.
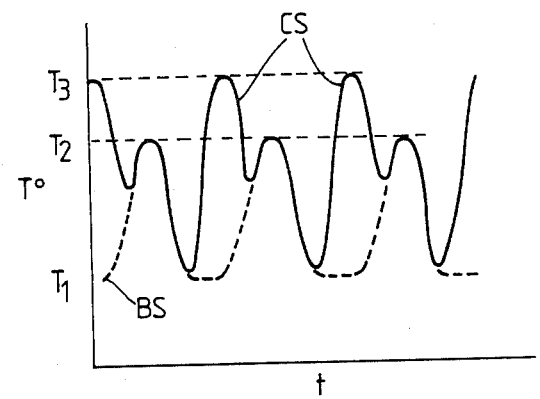
Fig. 3.
Fig. 4.
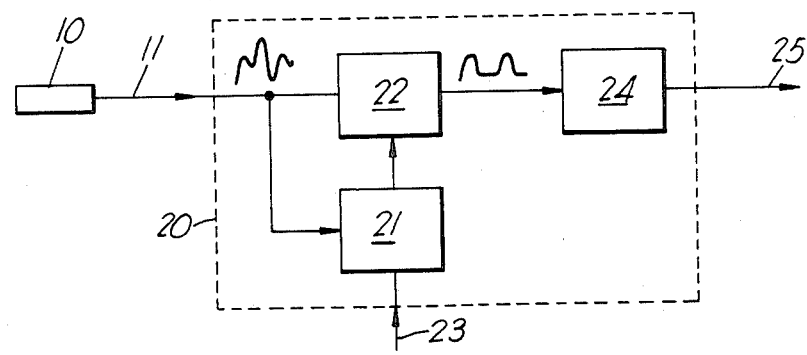

PYROMETER SYSTEMS FOR GAS-TURBINE ENGINES

BACKGROUND OF THE INVENTION

This invention relates to pyrometer systems for gas-turbine engines.

Measuring the temperature of rotating blades in a gas-turbine engine can be carried out by means of a pyrometer system which analyses the radiation emitted by the blades and from this obtains a measurement of the blade temperature. One problem with these systems is that radiation produced as a result of burning fuel in the combustion chamber may enter the pyrometer, either directly or by reflection from the moving or stationary components of the engine. Unless this extraneous radiation, or the signals it produces in the pyrometer system are removed, it can lead to errors in the measurement of temperature. Attempts to remove the effects of the flame signal are made more difficult by the fact that the system may be required to respond to an anomalously high signal such as produced by an overheated blade.

BRIEF DESCRIPTION OF THE INVENTION

It is an object of the present invention to provide a pyrometer system that can be arranged to be insensitive to excessively high signals produced by radiation from the combustion chamber.

According to one aspect of the present invention there is provided a pyrometer system for providing an indication of the temperature of rotating blades in a gas-turbine engine including a pyrometer arranged to view the blades and produce an output signal in accordance with radiation received by pyrometer, processing means arranged to receive the output signal and to identify an excess temperature signal higher than the average blade temperature signal which occurs in synchronism with each blade temperature signal, and wherein the processing means is arranged to interrupt passage of the said output signal during successive occurrences of the excess temperature signal in synchronism with the blade rotation frequency such as to remove the effect of the excess temperature signal from the indication of the temperature of the blades.

The processing means may be arranged to receive an input signal according to engine speed or be self-synchronising from the output of the pyrometer.

According to another aspect of the present invention there is provided a pyrometer system for providing an indication of the temperature of rotating blades in a gas-turbine engine including a pyrometer arranged to view the blades and produce an output signal in accordance with radiation received by the pyrometer, processing means arranged to receive the said output signal, the processing means including a synchronisation means and gating means, the synchronisation means controlling operation of the gating means such that the gating means is closed for an interval between passage of adjacent blades such as to interrupt passage of excess temperature signals from the engine combustion chamber.

The output from the pyrometer may be either an electrical signal or an optical signal.

According to an additional aspect of the present invention there is provided a gas-turbine engine including a pyrometer system according to the above one or other aspect of the present invention.

According to a further aspect of the present invention there is provided a method of providing an indication of the temperature of rotating blades in a gas-turbine engine comprising the steps of viewing the blades of the engine with a pyrometer, monitoring the output signals of the pyrometer to identify which parts of the output signals arise from radiation from the blades and which arise from the combustion chamber, setting a synchronisation unit in synchronism with the blade signal, using the synchronisation unit to interrupt subsequent passage of signals arising from the combustion chamber, and providing an output signal indicative of blade temperature from signals passed by the synchronisation unit.

A pyrometer system in accordance with the present invention will now be described, by way of example, with reference to the accompanying drawings.

BRIEF DESCRIPTION OF DRAWINGS

FIGS. 2 and 3 show respective outputs from the pyrometers; and

FIG. 4 is a schematic diagram of the pyrometer system.

DETAILED DESCRIPTION

Figure 1:
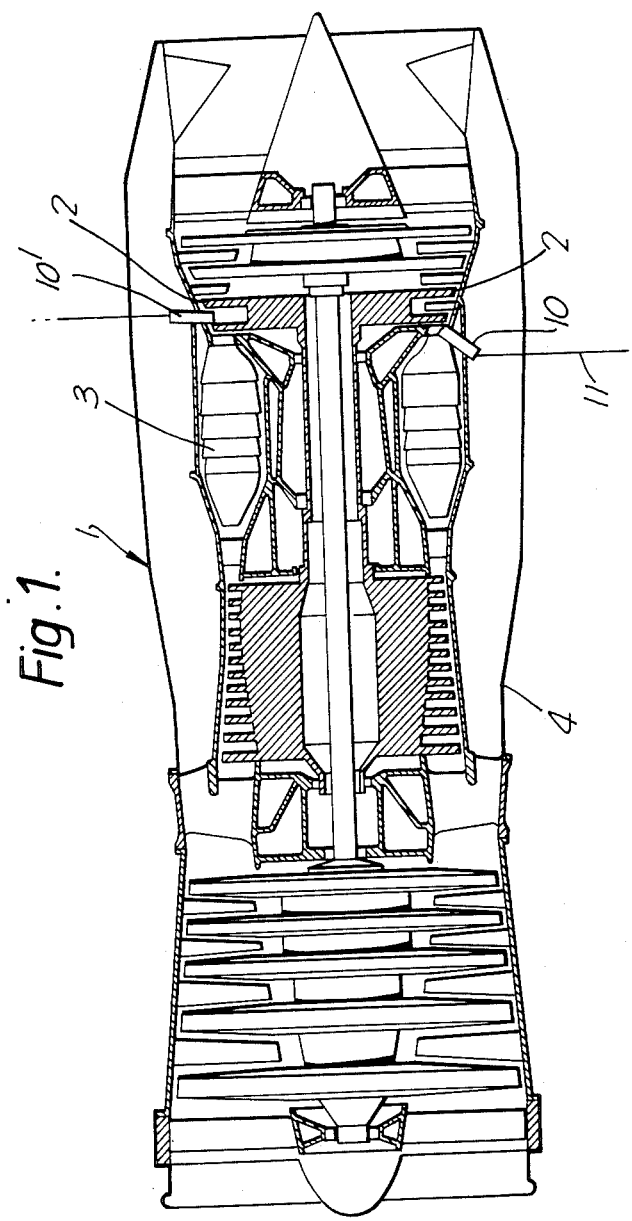
FIG. 1 is a schematic side elevation of a gas-turbine engine showing pyrometers installed on the engine.

With reference first to FIG. 1, there is shown a gas-turbine engine 1 with turbine blades 2 located downstream of the engine combustion chamber 3.

An optical pyrometer 10 of conventional kind is mounted within the casing 4 of the engine to view the blades 2 through an aperture in the casing. In practice, more than one pyrometer may be used, located at different mountings around the casing. An alternative mounting location for the pyrometers is illustrated by the pyrometer 10' which is located to view the blades 2 more nearly radially.

Radiation received by the pyrometer 10 will arise from the radiation produced by thermal emission from the blades 2 in accordance with their temperature. Radiation may also be received from the combustion chamber 3 by reflection from the blades 2 themselves as they rotate, or by secondary reflection from the blades after intermediate reflection from other engine surfaces, depending on the angle and installation position of the pyrometer.

The pyrometer may receive directly radiation from the combustion chamber 3 viewed between the blades 2 as they pass in front of the pyrometer if the angle and location of the pyrometer is such that it is directed towards the combustion chamber.

The output signal from the pyrometer 10 may be in the form of an electrical or optical signal, according to the type of pyrometer used, and this is supplied via a cable 11, which is an electrical or optical cable.

The typical output signal produced by the pyrometer 10 is shown in FIG. 2, whereas the output produced by the pyrometer 10' is shown in FIG. 3. In both Figures the total pyrometer output, as represented by the unbroken line, is made up of two component signals, namely the normal blade signal BS and the combustor signal CS. The normal blade signal BS is represented by the broken line and arises from radiation emitted by the blades themselves. The combustor signal CS arises from radiation from the combustion chamber which either passes directly, or by reflection, to the pyrometer and is superimposed on the normal blade signal BS.

With reference first to FIG. 2, it will be seen that the signal rises relatively rapidly from a background temperature $T_1$ to the blade temperature $T_2$ as the blade 2 comes within the field of view of the pyrometer. The signal then falls as the blade 2 passes out the field of view, but then rises again to a value $T_3$ as the angle of the blade becomes such that radiation from the combustion chamber 3 is reflected into the field of view of the pyrometer 10. This signal then falls to the background level $T_1$ as the blade moves outside the field of view of the pyrometer. The signal received on line 11 therefore has two sets of peaks, one being caused by radiation emitted by the blades 2 and other other caused by radiation from the combustion chamber 3.

FIG. 3, shows the signal obtained when the blades are viewed more nearly radially. The flat base of the blade signal arises from radiation emitted from the cooler root of the blade and part of the turbine disc.

With reference now to FIG. 4, the output signals on cable 11 are supplied to a processing unit 20. The processing unit 20 functions to identify when the combustor signal CS occurs during the passage of one or more blades and, using this information, to gate signals during those intervals when the combustor signal is produced.

The combustor signals CS may be removed in several different ways. For example, the processing unit 20 may include a synchronisation unit 21 that controls opening and closing of a gate 22 connected in line 11 so that the combustor signals CS are passed or blocked respectively. The synchronisation unit 21 may receive a reference input signal on line 23 according to engine speed, or it may be self-synchronising in accordance with signals supplied to it from the pyrometer 10 itself. In either circumstance, the synchronisation unit 21 identifies when a blade will or will not be within the field of view of the pyrometer and controls gating at the gate 22 accordingly. This is achieved by initially monitoring the radiation received by the pyrometer for the particular engine and identifying which parts of the signal trace arise from combustor radiation or blade radiation. Identification of the combustor signals can be carried out by identifying the occurrence of the blade signals and then identifying a combustor signal because it arises between the blade signals. Alternatively, if the maximum value of the average blade temperature is known, signals from the combustor may be identified if they are higher than this. Once the respective parts of the signal that arise from the blades and from the combustor have been identified, the synchronisation unit 21 is set to produce output gating control signals during the appropriate part of the cycle of the signals received on line 11. During subsequent operation of the system, only those signals that occur during intervals coinciding with passage of a blade in the field of view of the pyrometer 10 will be passed. Those signals passed by the gate 22 are supplied to an output unit 24 which produces an output signal on line 25 that is appropriately scaled to indicate temperature. These procedures may be carried out on one engine in the laboratory and the results used to program the gating effected by the synchronisation unit for that type of engine when in use on an aircraft or in other applications.

Pyrometer systems according to the present invention thereby enable blade temperature to be determined accurately without being affected by combustion chamber flames. The system can still, however, be responsive to an overheated blade, since a temperature signal from such a blade will occur when the gate is open.

What I claim is:

1. A pyrometer system for providing an indication of the temperature of rotating blades in a gas-turbine engine comprising:
   (a) a pyrometer,
   (b) means mounting said pyrometer to view the blades to enable said pyrometer to produce an output signal in accordance with the radiation received by the pyrometer in response to thermal emission directly from said blades and also via reflections from said blades but originating with other sources,
   (c) processing means, and
   (d) means connecting said processing means with said pyrometer to receive said output signal,
   (e) said processing means including synchronization means, gating means, and output means, said synchronization means controlling said gating means to interrupt passage to the output means of temperature signals from the engine combustion chamber that occur repetitively between blade emission signals,
   whereby passage of the temperature signals from said other sources to said output means is prevented.

2. A method of providing an indication of the temperature of rotating blades in a gas-turbine engine comprising the steps of:
   (a) viewing the blades of the engine with a pyrometer to generate signals responsive to the radiation emitted and reflected by the blades,
   (b) differentiating the output signals of the pyrometer between those parts thereof arising from emission of radiation from the blades and those parts arising from the reflection by the blades of combustion chamber radiation,
   (c) generating gating signals in synchronism with the aforesaid differentiated signals,
   (d) interrupting in response to said gating signals the subsequent passage of repetitive signals arising from the reflections of combustion chamber radiation by the blades occurring between each blade emission signal,
   (e) and generating an output signal indicative of blade temperature substantially only from the signals responsive to the signals responsive to the temperature of the blades.

3. A pyrometer system according to claim 1, including means supplying an input signal to the synchronization means according to engine speed.

4. A pyrometer system according to claim 1, wherein the processing means is self-synchronising from the output of the pyrometer.

5. A pyrometer system according to claim 1, wherein the output from the pyrometer is an electrical signal.

6. A pyrometer system according to claim 1, wherein the output from the pyrometer is an optical signal.

7. A gas-turbine engine including a pyrometer system as claimed in claim 1.

* * * * *